(12) United States Patent
Corry

(10) Patent No.: US 8,191,617 B2
(45) Date of Patent: Jun. 5, 2012

(54) SYNGAS COOLER AND COOLING TUBE FOR USE IN A SYNGAS COOLER

(75) Inventor: Judeth Helen Brannon Corry, Manvel, TX (US)

(73) Assignee: General Electric Company, Schenectady, NY (US)

( * ) Notice: Subject to any disclaimer, the term of this patent is extended or adjusted under 35 U.S.C. 154(b) by 1008 days.

(21) Appl. No.: 11/835,158

(22) Filed: Aug. 7, 2007

(65) Prior Publication Data

US 2009/0038155 A1    Feb. 12, 2009

(51) Int. Cl.
*F28D 7/10* (2006.01)
(52) U.S. Cl. .................. 165/182; 29/890.046; 422/200; 165/157
(58) Field of Classification Search ............. 29/890.046; 165/157, 182
See application file for complete search history.

(56) References Cited

U.S. PATENT DOCUMENTS

| | | | |
|---|---|---|---|
| 3,305,013 A * | 2/1967 | Reiner et al. | ........... 165/183 |
| 3,433,298 A | 3/1969 | Vollhardt | |
| 3,648,768 A | 3/1972 | Scholl | |
| 3,662,717 A | 5/1972 | Ter Haar | |
| 4,029,054 A | 6/1977 | Schuurman | |
| 4,098,324 A | 7/1978 | Kummel et al. | |
| 4,187,902 A | 2/1980 | Miller, Jr. et al. | |
| 4,245,479 A | 1/1981 | Richter, Jr. et al. | |
| 4,270,493 A | 6/1981 | Blaskowski | |
| 4,377,132 A | 3/1983 | Koog et al. | |
| 4,493,291 A | 1/1985 | Zabelka | |
| 4,513,694 A | 4/1985 | Wiemer | |
| 4,700,772 A | 10/1987 | Baumberger | |
| 4,768,470 A | 9/1988 | Ziegler | |
| 4,876,987 A | 10/1989 | Martin et al. | |
| 4,936,376 A | 6/1990 | Martin et al. | |
| 4,959,078 A | 9/1990 | Ziegler | |
| 5,233,943 A | 8/1993 | Martin et al. | |
| 5,713,312 A | 2/1998 | Waryasz | |
| 6,051,195 A | 4/2000 | Deeke et al. | |
| 7,730,616 B2 | 6/2010 | Goller et al. | |
| 7,749,290 B2 | 7/2010 | Wallace | |
| 2007/0119577 A1 | 5/2007 | Kraft et al. | |

(Continued)

FOREIGN PATENT DOCUMENTS

DE     970031 C     8/1958

(Continued)

OTHER PUBLICATIONS

Mills, Anthony, Heat Transfer, ISBN 0-256-07642-1, 1992. pp. 85-89, and 94.*

(Continued)

*Primary Examiner* — David Bryant
*Assistant Examiner* — Moshe Wilensky
(74) *Attorney, Agent, or Firm* — Armstrong Teasdale LLP

(57) ABSTRACT

A method of assembling a syngas cooler is provided. The method includes coupling at least one cooling tube within the syngas cooler, wherein the at least one cooling tube includes an inner surface that defines a flow passage therethrough, an opposite outer surface, and at least one cooling fin extending outward from the outer surface, and orienting the at least one cooling tube such that the at least one cooling fin is in flow communication within a syngas flow passage defined in the syngas cooler, wherein the cooling fin facilitates enhancing heat transfer between fluid flowing in the at least one cooling tube and a syngas flow.

14 Claims, 4 Drawing Sheets

U.S. PATENT DOCUMENTS

2008/0175770 A1 * 7/2008 Wallace .................. 422/201

FOREIGN PATENT DOCUMENTS

| DE | 3323818 | A1 | 1/1984 |
| FR | 1437831 | A | 7/1966 |
| GB | 729425 | | 5/1955 |
| WO | 91/10106 | A1 | 7/1991 |
| WO | 91/10107 | A1 | 7/1991 |
| WO | 2007/055930 | A2 | 5/2007 |

OTHER PUBLICATIONS

WO Search Report issued in connection with corresponding WO Patent Application No. US08/068955 filed on Jul. 2, 2008.

Mills, Anthony, Heat Transfer, ISBN 0-256-07642-1, 1992, pp. 83-88, and 94.

* cited by examiner

SYNGAS COOLER AND COOLING TUBE FOR USE IN A SYNGAS COOLER

BACKGROUND OF THE INVENTION

This invention relates generally to gasification systems, and more specifically to a syngas cooler.

At least some known gasification systems are integrated with at least one power-producing turbine system. For example, at least some known gasifiers convert a mixture of fuel, air or oxygen, steam, and/or limestone into an output of partially combusted gas, sometimes referred to as "syngas." The hot syngas may be supplied to a combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some known gasification systems use a separate gasifier that, in combination with the syngas cooler, facilitates gasifying feedstocks, recovering heat, and removing solids from the syngas to make the syngas more useable by other systems. Moreover, at least some known syngas coolers include a plurality of water-filled tubes that provide cooling to the syngas. One method of increasing the cooling potential of the syngas cooler requires increasing the number of water-filled tubes within the syngas cooler. However, increasing the number of water-filled tubes also increases the overall size and cost of the gasification system.

BRIEF DESCRIPTION OF THE INVENTION

In one aspect, a method of assembling a syngas cooler is provided. The method includes coupling at least one cooling tube within the syngas cooler, wherein the at least one cooling tube includes an inner surface that defines a flow passage therethrough, an opposite outer surface, and at least one cooling fin extending outward from the outer surface, and orienting the at least one cooling tube such that the at least one cooling fin is in flow communication within a syngas flow passage defined in the syngas cooler, wherein the cooling fin facilitates enhancing heat transfer between fluid flowing in the at least one cooling tube and a syngas flow.

In another aspect, a cooling tube for use in a syngas cooler is provided. The cooling tube includes an inner surface that defines a flow passage extending through the cooling tube, the flow passage is configured to channel a cooling fluid therethrough, an outer surface opposite the inner surface, and at least one cooling fin extending outward from the outer surface, the cooling fin facilitates increasing heat exchange between the fluid channeled through the flow passage and a second fluid flowing past the cooling tube.

In a further aspect, a syngas cooler is provided. The syngas cooler includes at least one cooling tube extending through the syngas cooler, the at least one cooling tube comprising an inner surface that defines a flow passage extending through the at least one cooling tube, the flow passage is configured to channel a cooling fluid therethrough, an outer surface opposite the inner surface, and at least one cooling fin extending outward from the outer surface, the at least one cooling fin facilitates increasing heat exchange between the fluid channeled through the flow passage and a second fluid flowing past the at least one cooling tube.

DETAILED DESCRIPTION OF THE INVENTION

The present invention generally provides exemplary syngas coolers to facilitate cooling syngas in an integrated gasification combined-cycle (IGCC) power generation system. The embodiments described herein are not limiting, but rather are exemplary only. It should be understood that the present invention may apply to any gasification system that includes a syngas cooler.

Figure 1:
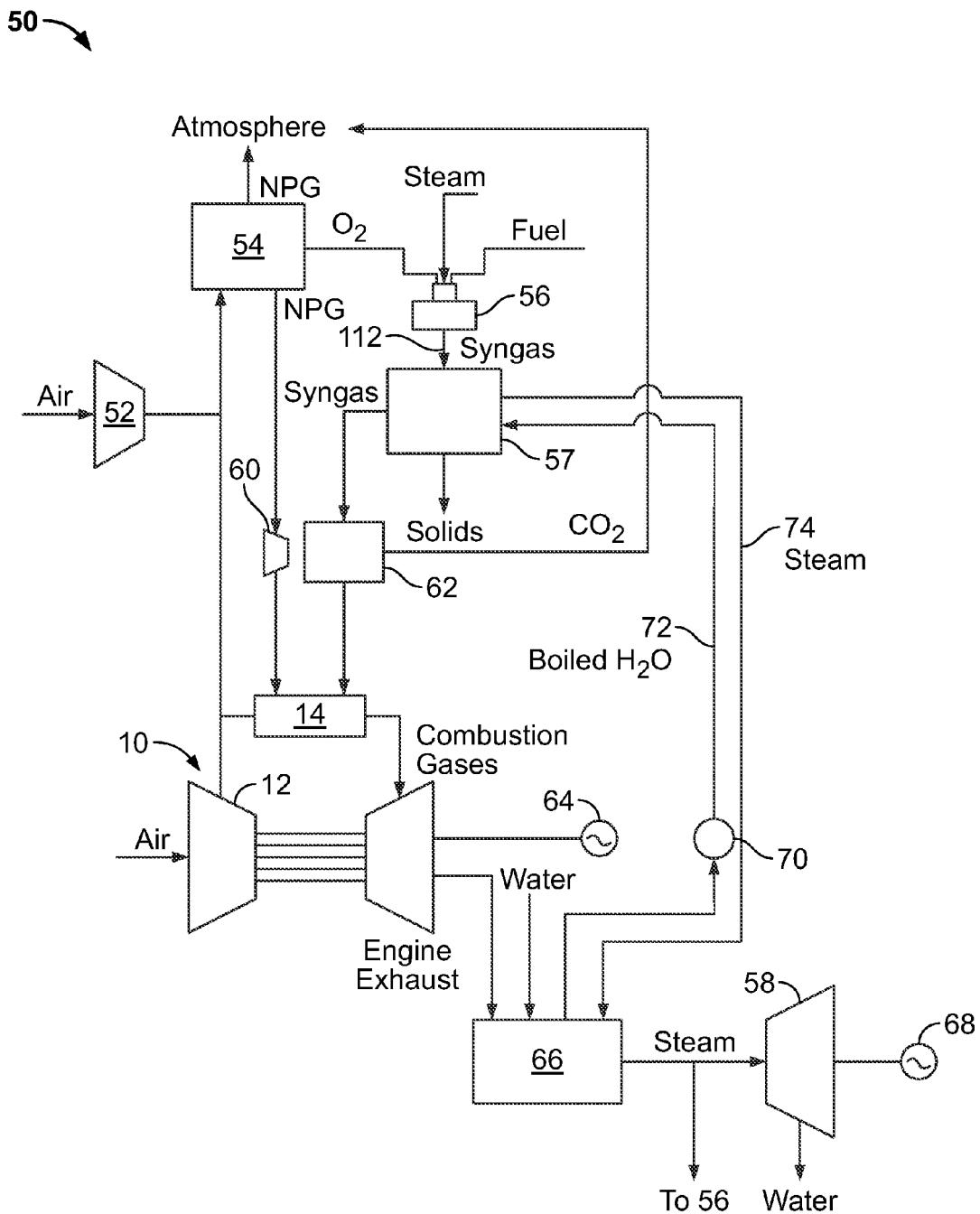
FIG. 1 is a schematic diagram of an exemplary integrated gasification combined-cycle (IGCC) power generation system.

FIG. 1 is a schematic diagram of an exemplary IGCC power generation system 50. IGCC system 50 generally includes a main air compressor 52, an air separation unit 54 coupled in flow communication to compressor 52, a gasifier 56 coupled in flow communication to air separation unit 54, a syngas cooler 57 coupled in flow communication to gasifier 56, a gas turbine engine 10 coupled in flow communication to syngas cooler 57, and a steam turbine 58.

In operation, compressor 52 compresses ambient air that is channeled to air separation unit 54. In some embodiments, in addition to compressor 52 or alternatively, compressed air from a gas turbine engine compressor 12 is supplied to air separation unit 54. Air separation unit 54 uses the compressed air to generate oxygen for use by gasifier 56. More specifically, air separation unit 54 separates the compressed air into separate flows of oxygen ($O_2$) and a gas by-product, sometimes referred to as a "process gas." The $O_2$ flow is channeled to gasifier 56 for use in generating partially combusted gases, referred to herein as "syngas," for use by gas turbine engine 10 as fuel, as described below in more detail. The process gas generated by air separation unit 54 includes nitrogen, referred to herein as "nitrogen process gas" (NPG). The NPG may also include other gases such as, but not limited to, oxygen and/or argon. For example, in some embodiments, the NPG includes between about 95% to about 100% nitrogen. In the exemplary embodiment, at least some of the NPG flow is vented to the atmosphere from air separation unit 54. Moreover, in the exemplary embodiment, some of the NPG flow is injected into a combustion zone (not shown) within gas turbine engine combustor 14 to facilitate controlling emissions of engine 10, and more specifically to facilitate reducing the combustion temperature and a nitrous oxide emissions of engine 10. IGCC system 50, in the exemplary embodiment, also includes a compressor 60 for compressing the NPG flow before injecting the NPG into combustor 14.

In the exemplary embodiment, gasifier 56 converts a mixture of fuel, $O_2$ supplied by air separation unit 54, steam, and/or limestone into an output of syngas 112 for use by gas turbine engine 10 as fuel. Although gasifier 56 may use any fuel, in the exemplary embodiment, gasifier 56 uses coal, petroleum coke, residual oil, oil emulsions, tar sands, and/or other similar fuels. Moreover, in the exemplary embodiment, syngas 112 generated by gasifier 56 includes carbon dioxide ($CO_2$).

Moreover, in the exemplary embodiment, syngas 112 generated by gasifier 56 is channeled to syngas cooler 57, which facilitates cooling syngas 112, as described in more detail below. Cooled syngas 112 is cleaned using a clean-up device 62 before syngas 112 is channeled to gas turbine engine combustor 14 for combustion thereof. In the exemplary embodiment, $CO_2$ may be separated from syngas 112 during cleaning and may be vented to the atmosphere, captured, and/or partially returned to gasifier 56. Gas turbine engine 10 drives a generator 64 that supplies electrical power to a power grid (not shown). Exhaust gases from gas turbine engine 10 are channeled to a heat recovery steam generator 66 that generates steam for driving steam turbine 58. Power generated by steam turbine 58 drives an electrical generator 68 that provides electrical power to the power grid. In the exemplary embodiment, steam from heat recovery steam generator 66 is also supplied to gasifier 56 for generating syngas.

Furthermore, in the exemplary embodiment, system 50 includes a pump 70 that supplies feed water 72 from steam generator 66 to syngas cooler 57 to facilitate cooling syngas 112 channeled therein from gasifier 56. Feed water 72 is channeled through syngas cooler 57, wherein feed water 72 is converted to a steam 74, as described in more detail below. Steam 74 is then returned to steam generator 66 for use within gasifier 56, syngas cooler 57, steam turbine 58, and/or other processes in system 50.

Figure 2:
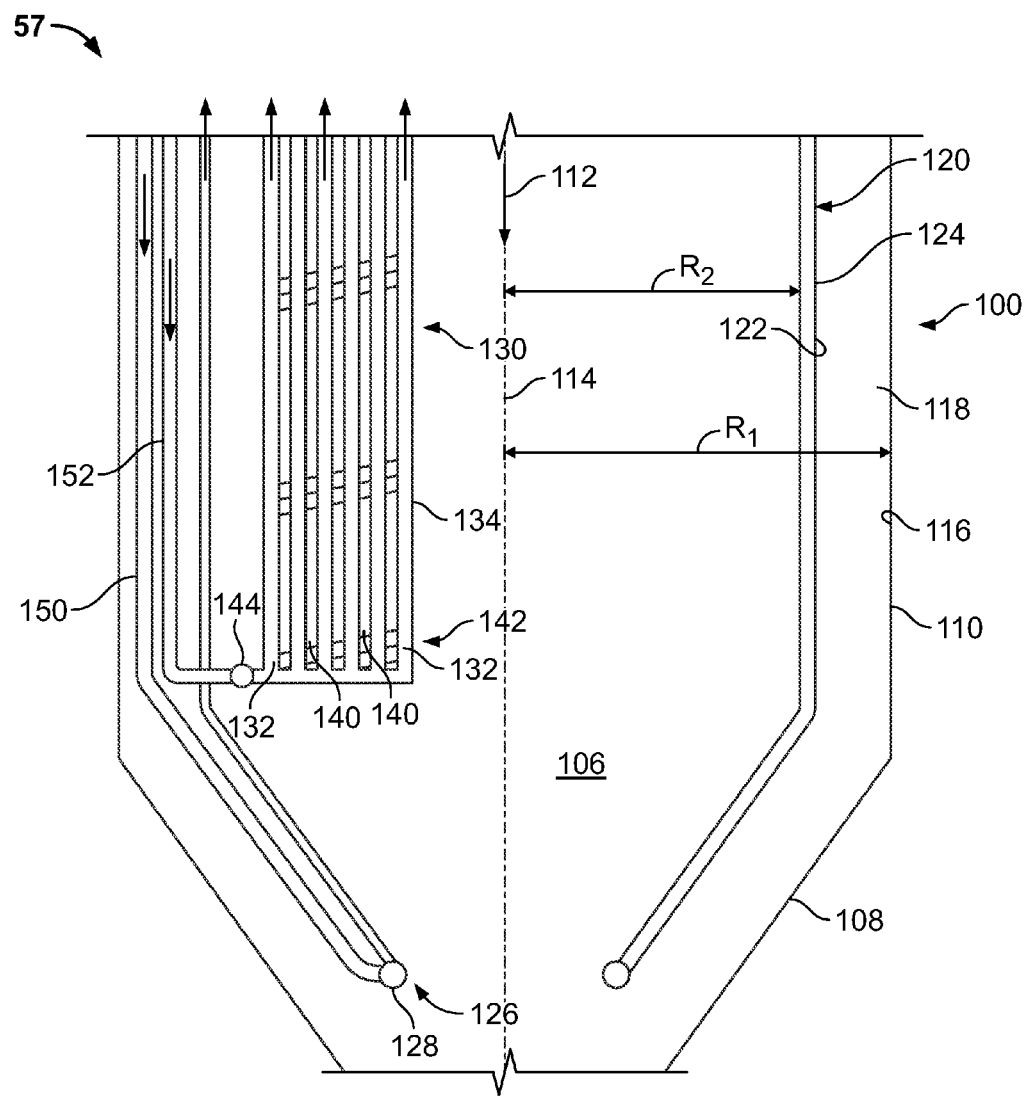
FIG. 2 is a schematic cross-sectional view of an exemplary syngas cooler that may be used with the system shown in FIG. 1.

FIG. 2 is a schematic cross-sectional view of an exemplary syngas cooler 57 that may be used with a gasification system, such as IGCC system 50 (shown in FIG. 1). In the exemplary embodiment, syngas cooler 57 is a radiant syngas cooler. Alternatively, syngas cooler 57 may be any syngas cooler that includes at least one cooling tube, as described in more detail below. In the exemplary embodiment, syngas cooler 57 includes a pressure vessel shell 100 having an upper shell (not shown), a lower shell 108, and a vessel body 110 extending therebetween. In the exemplary embodiment, vessel shell 100 is substantially cylindrical-shaped and defines an inner chamber 106 within syngas cooler 57. Moreover, vessel shell 100 is fabricated from a pressure quality material, for example, but not limited to, a chromium molybdenum steel. Accordingly, the material used in fabricating shell 100 enables shell 100 to withstand a pressure of syngas 112 within syngas cooler 57. Moreover, in the exemplary embodiment, syngas cooler 57 is fabricated with a radius $R_1$ that extends from a center axis 114 to an inner surface 116 of vessel shell 100. In the exemplary embodiment, gasifier 56 (shown in FIG. 1) is coupled in flow communication with syngas cooler 57 such that syngas 112 discharged from gasifier 56 is injected through an inlet (not shown) into syngas cooler 57, and more specifically, into inner chamber 106, as described in more detail below.

In the exemplary embodiment, syngas cooler 57 also includes an annular membrane wall, or tube cage, 120 that is coupled within chamber 106. In the exemplary embodiment, tube cage 120 is aligned substantially co-axially with center axis 114 and is formed with a radius $R_2$ that extends from center axis 114 to an outer surface 122 of tube cage 120. In the exemplary embodiment, radius $R_2$ is shorter than radius $R_1$. More specifically, in the exemplary embodiment, tube cage 120 is aligned substantially co-axially and extends generally axially within syngas cooler 57. As a result, in the exemplary embodiment, a substantially cylindrical-shaped space 118 is defined between inner surface 116 of vessel shell 100 and radially outer tube cage surface 122.

In the exemplary embodiment, tube cage 120 includes a plurality of water tubes, or cooling tubes, 124 that each extend axially through a portion of syngas cooler 57. Specifically, in the exemplary embodiment, each tube cage cooling tube 124 has an outer surface (not shown) and an opposite inner surface (not shown) that defines an inner passage (not shown) extending axially therethrough. More specifically, the inner passage of each tube cage cooling tube 124 enables cooling fluid to be channeled therethrough. In the exemplary embodiment, the cooling fluid channeled within each tube cage cooling tube 124 is feed water 72. Alternatively, the cooling fluid channeled within each tube cage cooling tube 124 may be any cooling fluid that is suitable for use in a syngas cooler. Moreover, in the exemplary embodiment, at least one pair of adjacent circumferentially-spaced apart cooling tubes 124 are coupled together using a web portion (not shown). In the exemplary embodiment, tube cage cooling tubes 124 are fabricated from a material that facilitates heat transfer, such as, but not limited to, chromium molybdenum steel, Incoloy 800Lc, stainless steel, and other nickel-based alloys. Specifically, a downstream end 126 of each cooling tube 124 is coupled in flow communication to an inlet manifold 128. Similarly, in the exemplary embodiment, an upstream end (not shown) of each tube cage cooling tube 124 is coupled in flow communication to a tube cage riser (not shown).

Syngas cooler 57, in the exemplary embodiment, includes at least one heat transfer panel, or platen 130, that extends generally radially from tube cage 120 towards center axis 114. Alternatively, each platen 130 may extend obliquely away from tube cage 120. Specifically, in the exemplary embodiment, each platen 130 includes a plurality of cooling tubes 132 that extend generally axially through syngas cooler 57. Each platen cooling tube 132 includes an outer surface 134 and an inner surface 136 (not shown in FIG. 2) that defines an inner passage 138 (not shown in FIG. 2) that extends axially through platen cooling tube 132. In the exemplary embodiment, at least one pair of generally radially-spaced platen cooling tubes 132 are coupled together using a web portion 140 to form each platen 130. Moreover, in the exemplary embodiment, platen cooling tubes 132 are fabricated from a material that facilitates heat transfer, such as, but not limited to, chromium molybdenum steel, Incoloy 800Lc, stainless steel, and other nickel-based alloys. In the exemplary embodiment, each platen cooling tube 132 includes a downstream end 142 that is coupled in flow communication with a platen inlet manifold 144. Similarly, in the exemplary embodiment, an upstream end (not shown) of each platen cooling tube 132 is coupled in flow communication to a platen riser 148 (not shown in FIG. 2).

In the exemplary embodiment, syngas cooler 57 also includes a plurality of tube cage downcomers 150 and a plurality of platen downcomers 152 that each extend generally axially within space 118. Specifically, downcomers 150 and 152 each include an inner surface (not shown) that defines an inner passage (not shown) that extends generally axially through each downcomer 150 and 152. More specifically, in the exemplary embodiment, each tube cage downcomer 150 is coupled in flow communication with tube cage inlet manifold 128, and each platen downcomer 152 is coupled in flow communication with platen inlet manifold 144.

During operation, in the exemplary embodiment, each tube cage downcomer 150 channels a flow of feed water 72 to tube cage inlet manifold 128, and more specifically, to each tube cage cooling tube 124. Similarly, each platen downcomer 152 channels feed water 72 to platen inlet manifold 144, and more specifically, to each platen cooling tube 132. Specifically, to facilitate enhanced cooling of syngas 112, in the exemplary embodiment, feed water 72 is channeled upstream, with respect to the flow of syngas 112 through syngas cooler 57. Heat from syngas 112 is transferred from the flow of syngas 112 to the flow of feed water 72 channeled through each cooling tube 124 and 132. As a result, feed water 72 is converted to steam 74 and the syngas 112 is facilitated to be cooled. Specifically, in the exemplary embodiment, heat from syngas 112 is transferred from the syngas 112 to the flow of feed water 72 such that feed water 72 is converted to steam 74. The steam 74 produced is channeled through each cooling tube 124 and platen cooling tube 132 towards tube cage risers (not shown) and platen risers 148, respectively, wherein the steam 74 is discharged from syngas cooler 57.

Figure 3:
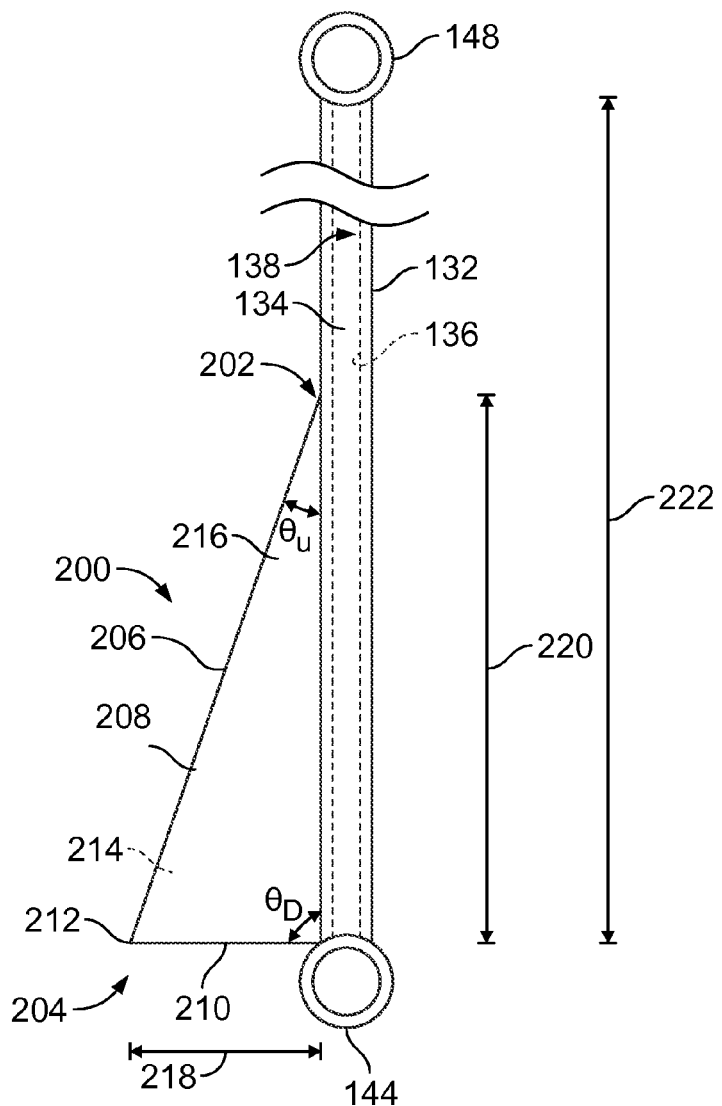
FIG. 3 is a side-view of an exemplary cooling fin that may be used with the syngas cooler shown in FIG. 2.
Figure 4:
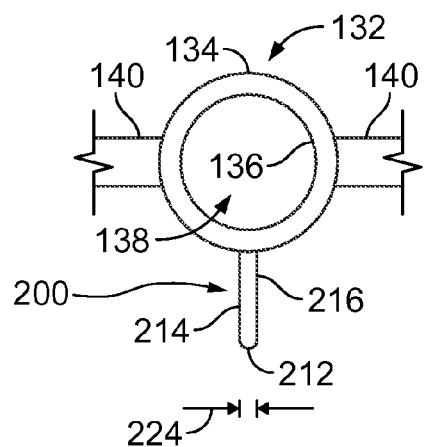
FIG. 4 is a cross-sectional top-view of the cooling fin shown in FIG. 3.

FIG. 3 is a schematic side-view of a cooling fin 200 extending outward from a cooling tube, such as platen cooling tube 132. FIG. 4 is a cross-sectional top-view of cooling fin 200. In the exemplary embodiment, at least one cooling fin 200 extends away from platen cooling tube 132. Alternatively, at least one cooling fin 200 extends away from at least one of cooling tube 124 and platen cooling tube 132. In the exemplary embodiment, cooling fin 200 includes an upstream end 202, a downstream end 204, and a body 206 extending therebetween. Body 206 is formed in the exemplary embodiment with an upstream edge 208, a downstream edge 210, and a tip portion 212 that extends therebetween. Moreover, in the exemplary embodiment, cooling fin 200 also includes a first side surface 214 and a second side surface 216.

In the exemplary embodiment, upstream end 202 is substantially flush with outer surface 134 and downstream end 204 extends a distance 218 away from outer surface 134. In known syngas coolers, particulate matter entrained within syngas 112 may cause a build-up, or foul, components within syngas cooler 57. As described in more detail below, each cooling fin 200 facilitates reducing such fouling by extending outward from outer surface 134 at an angle $\theta_U$ to facilitate removing fouled material during transient events, such as, but not limited to, temperature and/or pressure transients. More specifically, in the exemplary embodiment, each cooling fin 200 is formed along each platen cooling tube 132 at a distance (not shown) from syngas cooler inlet (not shown), wherein the orientation and relative location of such fins 200 facilitates reducing fouling of each cooling tube 132. For example, in one embodiment, each cooling fin 200 extends generally along the total length 222 of each platen cooling tube 132. In another embodiment, each cooling fin 200 extends across only a portion of each respective cooling tube 132, such as for example between about 0% to about 66%, or between about 0% to about 33% of length 222, as measured from downstream end 142 of platen cooling tube 132.

Moreover, in the exemplary embodiment, each cooling fin upstream edge 208 extends outward from platen cooling tube outer surface 134 at angle $\theta_U$. Generally, angle $\theta_U$ is between about 1° to about 40° measured with respect to outer surface 134. In the exemplary embodiment, angle $\theta_U$ is about 30°. Similarly, trailing edge 210 extends outward from outer surface 134 at an angle $\theta_D$. Generally, angle $\theta_D$ is between about 40° to about 135° measured with respect to outer surface 134. In the exemplary embodiment, angle $\theta_D$ is about 90°.

Cooling fin 200, in the exemplary embodiment, has a thickness 224 measured between first side surface 214 and second side surface 216 of cooling fin 200. In the exemplary embodiment, thickness 224 is generally constant along cooling fin body 206 from upstream edge 208 to tip portion 212. Alternatively, thickness 224 may vary along cooling fin body 206. For example, in an alternative embodiment, cooling fin 200 may have a first thickness defined generally at one fin end 202 or 212, and a second thickness defined generally at the other fin end 212 or 202. Moreover, in another embodiment, fin body 206 may taper from upstream edge 208 to tip portion 212 or vice-versa.

The number, the orientation, and the dimensions of cooling fins 200, is based on an amount of heat desired to be transferred from the syngas 112 to feed water 72. Generally, a total surface area defined by cooling tubes 124 and 132, or heat transfer surface area (not shown), is substantially proportional to the amount of heat transferred from the flow of syngas 112 to the flow of feed water 72. Accordingly, increasing the number of cooling fins 200 facilitates reducing the temperature of syngas 112 discharged from syngas cooler 57 as the surface area (not shown) of each corresponding platen cooling tube 132 is increased. Moreover, increasing the heat transfer surface area enables an overall length and/or radius $R_1$ of syngas cooler 57 to be reduced without adversely affecting the amount of heat transferred from the flow of syngas 112. Reducing the overall length and/or radius $R_1$ of syngas cooler 57 facilitates reducing the size and cost of syngas cooler 57. As a result, increasing the heat transfer surface area within syngas cooler 57 by adding at least one cooling fin 200 enables the overall length and/or radius $R_1$ of syngas cooler 57 to be reduced. As such, the size and cost of syngas cooler is facilitated to be reduced.

Figure 5:
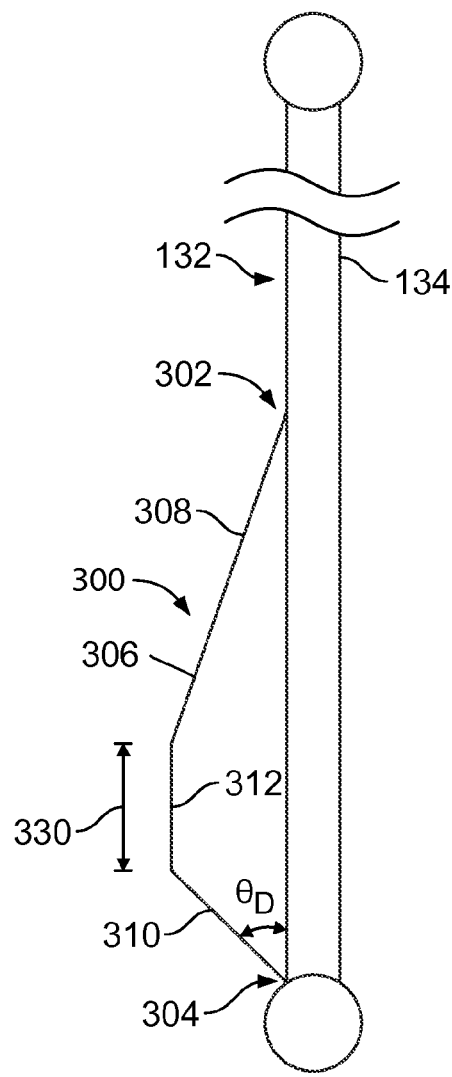
FIG. 5 is a side-view of an alternative embodiment of a cooling fin that may be used with the syngas cooler shown in FIG. 2.

FIG. 5 is a side-view of an alternative cooling fin 300 that may be used with syngas cooler 57 (shown in FIG. 2). Components of cooling fin 300 are substantially similar to components of cooling fin 200, and like components are identified with like reference numerals. More specifically, cooling fin 300 and cooling fin 200 are substantially similar except that in the exemplary embodiment, each cooling fin 300 is also formed with a tip portion 312 having a length 330. In the exemplary embodiment, each cooling fin 300 is formed with an upstream end 302, a downstream end 304, and a body 306 that extends therebetween. Specifically, in the exemplary embodiment, body 306 includes an upstream edge 308, a downstream edge 310, and a tip portion 312 extending therebetween. In the exemplary embodiment, downstream edge 310 extends outward from outer surface 134 towards tip portion 312 at an angle $\theta_D$. Generally, angle $\theta_D$ is between about 40° to about 135° measured with respect to outer surface 134. In the exemplary embodiment, angle $\theta_D$ is about 45°. Moreover, in the exemplary embodiment, tip portion 312 has a length 330 measured from upstream edge 308 to downstream edge 310.

Figure 6:
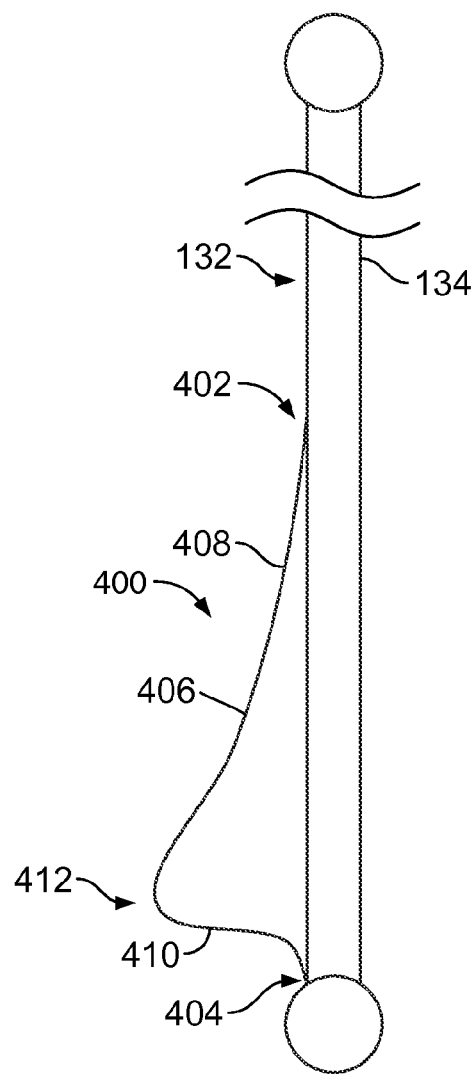
FIG. 6 is a side-view of yet another alternative embodiment of a cooling fin that may be used within the syngas cooler shown in FIG. 2.

FIG. 6 is a side-view of another alternative cooling fin 400 that may be used with syngas cooler 57 (shown in FIG. 2). Components of cooling fin 400 are substantially similar to components of cooling fin 200, and like components are identified with like reference numerals. More specifically, cooling fin 400 and cooling fin 200 are substantially similar except that in the exemplary embodiment, cooling fin 400 is formed with a curved upstream edge 408, a curved downstream edge 410, and a rounded tip portion 412 extending therebetween. In the exemplary embodiment, cooling fin 400 includes an upstream end 402, a downstream end 404, and a body 406 that extends therebetween. Specifically, in the exemplary embodiment, body 406 is formed with an upstream edge 408, downstream edge 410, and a tip portion 412 extending therebetween. In the exemplary embodiment, downstream edge 410 extends arcuately from outer surface 134 of platen cooling tube 132 towards tip portion 412. Moreover, in the exemplary embodiment, downstream edge 410 extends arcuately from outer surface 143 towards tip portion 412. Further, in the exemplary embodiment, tip portion 412 is substantially rounded and extends arcuately between upstream edge 408 and downstream edge 410.

During operation, in the exemplary embodiment, syngas 112 is discharged from gasifier 56 into chamber 106 through syngas cooler inlet (not shown), and more specifically, into tube cage 120. Syngas cooler 57, in the exemplary embodiment, includes at least one platen 130 that extends generally radially outward from tube cage 120 towards center axis 114. Specifically, in the exemplary embodiment, the flow of syngas 112 is channeled over outer surface 134 and at least one cooling fin 200 extending therefrom. Alternatively, syngas cooler 57 includes at least one cooling fin 200 that extends outward from at least one of cooling tube 124 and platen cooling tube 132. In the exemplary embodiment, syngas 112 is channeled over first and second side surfaces 214 and 216, respectively, to facilitate transferring heat from the flow of syngas 112 to the flow of feed water 72. Moreover, in the exemplary embodiment, cooling fins 200 facilitate increasing the heat transfer surface area of each platen cooling tube 132. As a result, in the exemplary embodiment, increasing the heat transfer surface area facilitates at least one of increasing the heat transferred from the flow of syngas 112 to the flow of feed water 72, and reducing the overall length and/or radius $R_1$ of syngas cooler 57.

Moreover, during operation, syngas 112 discharged from gasifier 56 may contain particulate matter therein. In some known syngas coolers, particulate matter may cause a buildup on, or foul, components within syngas cooler 57. The fouling on components within syngas cooler 57, such as cooling tubes 132, facilitates reducing the amount of heat transferred from the flow of syngas 112 to the flow of feed water 72. Accordingly, in the exemplary embodiment, cooling fin upstream edge 208 extends outward from platen cooling tube 132 at angle $\theta_U$ to facilitate reducing fouling on cooling tube 132. Specifically, in the exemplary embodiment, angle $\theta_U$ is oriented such that fouling falls off cooling tube 132 or reduced the accumulation of fouling thereon.

As described above, in the exemplary embodiment, at least one cooling fin 200 facilitates cooling the flow of syngas 112 by increasing the heat transfer surface area of at least one platen cooling tube 132. Specifically, in the exemplary embodiment, each cooling fin 200 extends outward from outer surface 134. As such, in the exemplary embodiment, each cooling fin 200 extends substantially into the flow of syngas 112. As a result, in the exemplary embodiment, the flow of syngas 112 is channeled over both platen cooling tubes 132 and at least one cooling fin 200, both of which facilitate transferring heat from the flow of syngas 112 to the flow of feed water 72 channeled through each platen cooling tube 132. Accordingly, a temperature of the flow of syngas 112 is facilitated to be reduced. Moreover, as described above, increasing the heat transfer surface area enables the overall length and/or radius $R_1$ of syngas cooler 57 to be reduced without adversely affecting the amount of heat transferred from the flow of syngas 112.

The above-described methods and apparatus facilitate cooling syngas channeled through a syngas cooler by positioning at least one cooling fin extending outward from at least one cooling tube into the flow of the syngas. The cooling fin facilitates increasing the heat transfer surface area of the cooling tube, thus increasing heat transfer between the syngas flowing past that cooling tube and the feed water flowing through that cooling tube. Moreover, increasing the surface area of a plurality of cooling tubes enables the overall size of the syngas cooler to be reduced without reducing an amount of heat transfer in the cooler. Specifically, increasing the surface area of each cooling tube also facilitates reducing the overall length and radius of the syngas cooler. As a result, increasing the surface area of each cooling tube facilitates reducing the overall size and cost of the syngas cooler.

Moreover, the above-described methods and apparatus facilitate reducing particulate matter within the syngas from building up on, or fouling, each associated cooling tube. Specifically, each cooling fin is formed with an upstream end, a downstream end, and a body extending therebetween. More specifically, the body includes an upstream edge, a downstream edge, and a tip portion extending therebetween. The upstream edge extends outward from the platen cooling tube at an angle of about 30° to facilitate reducing fouling on each cooling tube, which facilitates increasing heat transfer from the flow of syngas to the flow of cooling fluid channeled through each corresponding platen cooling tube.

Exemplary embodiments of cooling tubes including at least one cooling fin are described in detail above. The cooling fin is not limited to use with the syngas cooler described herein, but rather, the cooling fin can be utilized independently and separately from other syngas cooler components described herein. Moreover, the invention is not limited to the embodiments of the cooling fins described above in detail. Rather, other variations of the cooling fins may be utilized within the spirit and scope of the claims.

While the invention has been described in terms of various specific embodiments, those skilled in the art will recognize that the invention can be practiced with modification within the spirit and scope of the claims.

What is claimed is:

1. A cooling tube for use in a syngas cooler, said cooling tube comprising:
   an inner surface that defines a flow passage extending through said cooling tube, said flow passage is configured to channel a cooling fluid therethrough;
   an outer surface opposite said inner surface; and
   at least one cooling fin extending outward from said outer surface, said at least one cooling fin comprising:
      an upstream end, a downstream end, and a body that extends between said upstream and downstream ends, said body comprising an upstream edge that extends between said body upstream and downstream ends, said upstream edge is oriented obliquely with respect to said cooling tube outer surface and comprises an arcuate surface that facilitates preventing fouling on said cooling tube, said cooling fin facilitates transferring heat from a second fluid flowing outside said cooling tube to the cooling fluid flowing through said flow passage.

2. A cooling tube in accordance with claim 1 wherein said at least one cooling fin body further comprises:
   a downstream edge extending from said body between said upstream edge to said downstream end.

3. A cooling tube in accordance with claim 1 wherein said upstream edge extends outward from said tube outer surface, such that all of said upstream edge is at an angle between about 1° to about 40° relative to said tube outer surface.

4. A cooling tube in accordance with claim 2 wherein said upstream edge extends outward from said tube outer surface, wherein said upstream edge couples to said tube outer surface at an angle approximately equal to about 30°.

5. A cooling tube in accordance with claim 2 wherein said downstream edge generally extends outward from said tube outer surface at an angle between about 40° to about 135°.

6. A syngas cooler comprising:
at least one cooling tube extending through said syngas cooler, said at least one cooling tube comprising:
an inner surface that defines a flow passage extending through said at least one cooling tube, said flow passage is configured to channel a cooling fluid therethrough;
an outer surface opposite said inner surface; and
at least one cooling fin extending outward from said outer surface, said at least one cooling fin comprising:
an upstream end, a downstream end, and a body that extends between said upstream and downstream ends, said body comprising an upstream edge that extends between said body upstream and downstream ends, said upstream edge is oriented obliquely with respect to said cooling tube outer surface and comprises an arcuate surface that facilitates preventing fouling on said cooling tube, said at least one cooling fin facilitates transferring heat from a second fluid flowing outside said at least one cooling tube to the cooling fluid flowing through said flow passage.

7. A syngas cooler in accordance with claim 6 further comprising a plurality of said cooling tubes coupled together to form at least one of a tube cage and at least one platen.

8. A syngas cooler in accordance with claim 6 wherein said at least one cooling fin body further comprises:
a downstream edge extending from said body between said upstream edge to said downstream end.

9. A syngas cooler in accordance with claim 8 wherein said upstream edge generally extends outward from said tube outer surface, such that all of said upstream edge is at an angle between about 1° to about 40° relative to said tube outer surface, and said downstream edge generally extends outward from said tube outer surface, such that all of said downstream edge is at an angle between about 40° to about 135° relative to said tube outer surface.

10. A syngas cooler in accordance with claim 8 wherein said upstream edge extends outward from said tube outer surface, wherein said upstream edge couples to said tube outer surface at an angle approximately equal to about 30°.

11. A cooling tube in accordance with claim 2 wherein said cooling fin body further comprises:
a curved downstream edge extending from said upstream edge to said downstream end; and
a tip portion extending between said upstream edge and said curved downstream edge.

12. A cooling tube in accordance with claim 11 wherein said tip portion extends arcuately between said upstream edge and said downstream edge.

13. A syngas cooler in accordance with claim 8 wherein said cooling fin body further comprises:
a curved downstream edge extending from said upstream edge to said downstream end; and
a tip portion extending between said upstream edge and said curved downstream edge.

14. A syngas cooler in accordance with claim 13 wherein said tip portion extends arcuately between said upstream edge and said downstream edge.

* * * * *